United States Patent [19]
Borgese et al.

[11] 3,740,712
[45] June 19, 1973

[54] BURGLAR ALARM SYSTEM FOR AUTOMOTIVE VEHICLES AND THE LIKE

[76] Inventors: Domenic Borgese; Frances Borgese, both of 1620 South 8th Street, Philadelphia, Pa. 19148

[22] Filed: Jan. 7, 1972

[21] Appl. No.: 216,042

[52] U.S. Cl. ............................. 340/63, 307/10 AT
[51] Int. Cl. ............................................. B60r 25/10
[58] Field of Search ...................... 340/63, 64, 65; 307/10 AT

[56] References Cited
UNITED STATES PATENTS

| | | | |
|---|---|---|---|
| 3,172,080 | 3/1965 | Webb et al. | 340/63 X |
| 3,074,049 | 1/1963 | Saliba et al. | 340/63 X |
| 2,839,736 | 6/1958 | Tinsley et al. | 340/63 |

Primary Examiner—Alvin H. Waring
Attorney—Arthur A. Jacobs

[57] ABSTRACT

A burglar alarm system for vehicles comprising an alarm device which is actuated by any one of three electrical switches when a key-operated switch inside the vehicle is closed, one of the three switches being operatively connected to the gas refill, a second to the trunk and a third to the hood. Each passenger door is also provided with a switch in the alarm circuit and they are selectively actuated by a second key-operated switch on a fender.

5 Claims, 1 Drawing Figure

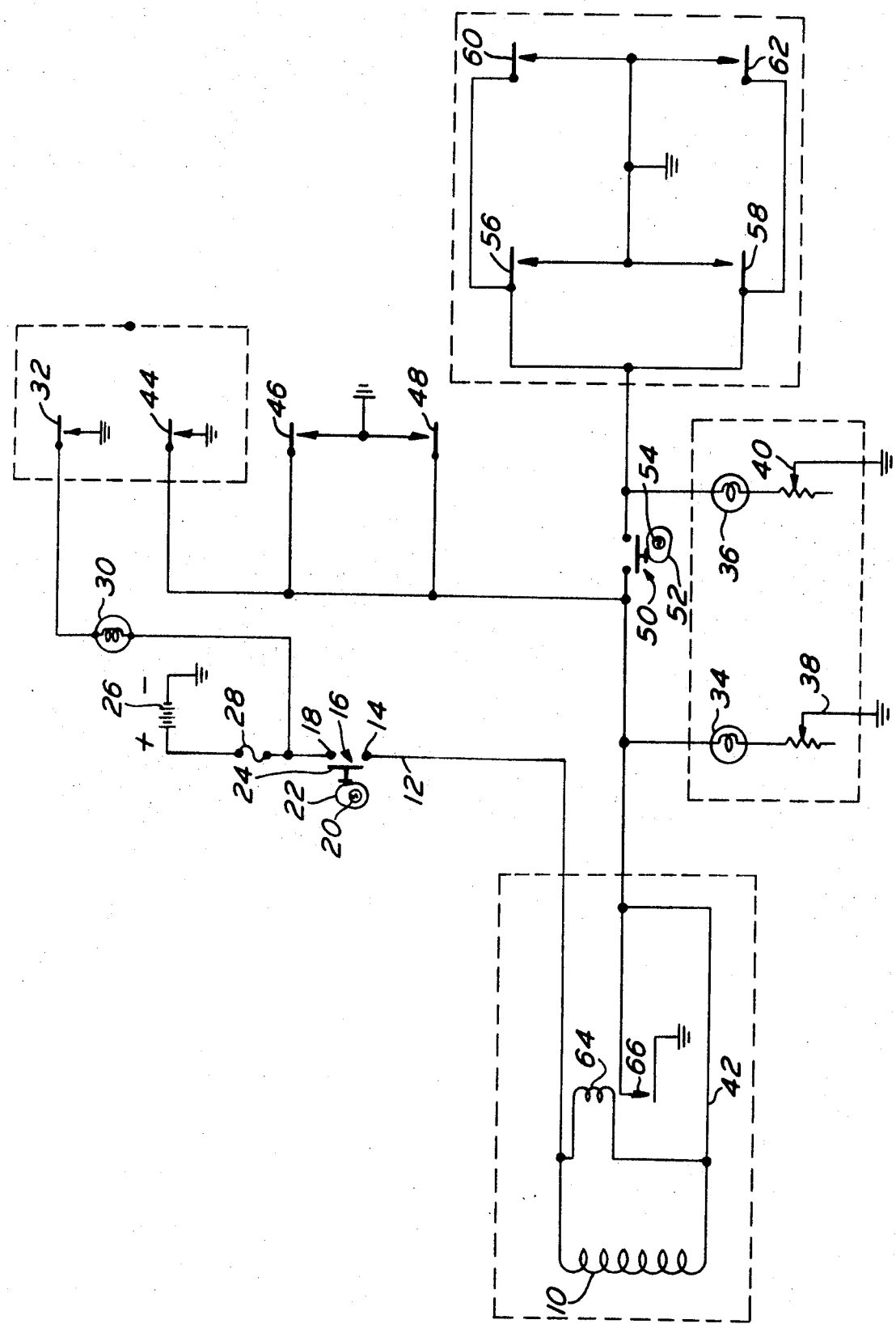

BURGLAR ALARM SYSTEM FOR AUTOMOTIVE VEHICLES AND THE LIKE

This invention relates to a tamper-resistant burglar alarm system, and it particularly relates to a system of the aforesaid type which is adapted for automotive vehicles and the like.

The theft of the contents of automotive vehicles or even of the vehicles themselves is becoming increasingly prevelant. Locking the doors and trunk of the vehicles is no longer any great protection since those persons engaged in car thefts have developed many ingenious methods of opening such locked cars.

In view of the above, it has become increasingly important to develop an effective burglar alarm system and many attempts have been made in that direction. However, such prior attempts always had one or more disadvantages. In this respect, they were rarely tamper-proof and could easily be inactivated by the experienced burglar. In those few instances where some degree of tamper-resistance was provided, they were usually highly complex and expensive and could only be installed in the vehicle with considerable difficulty and expense. Furthermore, few of such prior systems were really effective.

It is an object of the present invention to provide a burglar alarm system for vehicles and other exposed facilities which is tamper-resistant and yet relatively simple in construction, easy to install or replace, and inexpensive to produce.

Another object of the present invention is to provide a burglar alarm system of the aforesaid type which is highly effective and simple to use.

Other objects and many of the attendant advantages of this invention will be readily appreciated as the same becomes better understood by reference to the following description when read in conjunction with the accompanying drawings wherein:

The single FIGURE of the drawing is a schematic view of an electrical burglar alarm system embodying the present invention.

Referring now in greater detail to the drawing, there is shown an electrical network comprising a motor winding 10 adapted to operate a siren (not shown) when energized. The winding 10 is in circuit through line 12 with one terminal 14 of a key-operated control switch 16 which also has a terminal 18. The control switch 16 is normally open and is closed by turning a key in key-hole 20 on a cam 22. Turning the cam 22 acts to push switch element 24 against the terminals 14 and 18 to close the switch. Although a cam-operated switch is here illustrated, any other feasible type of key-operated switch means may be substituted, if desired. The terminal 18 of switch 16 is connected to a battery 26 through a fuse 28, the battery acting as the source of energy for energizing the winding 10 of the motor. The switch 16 is located inside the vehicle on the instrument panel.

Interposed in the circuit between the switch 16 and the battery 26 is a lamp 30 in circuit with a switch 32 on the door for the gas refill cap. The switch 32 is normally open when the door for the gas refill cap is closed. When the door is opened, the switch 32 is closed and energizes the lamp 30. The lamp 30 is mounted on the instrument panel. Preferably, magnetic latches are provided on the door for the gas refill cap to prevent the door from bouncing open while the car is in motion.

Also mounted on the instrument panel are a pair of lamps 34 and 36. These lamps 34 and 36 are each controlled by a respective rheostat, as at 38 and 40, in order to vary the intensity of the current flowing therethrough, these rheostats being so mounted on the instrument panel. In the system illustrated, the maximum intensity drawn through each lamp is approximately 0.1 amps (100 milliamps).

The lamp 34 is in circuit with the motor-winding 10 through lead line 42 and is also in circuit with switch 44 connected to the door for the gas refill cap, the switch 46 connected to the trunk lid and the switch 48 connected to the hood. In addition, the lamp 34 is connected through a lock-type switch 50, controlled by a cam 52 having a key-hole 54, to the lamp 36 as well as switches 56, 58, 60 and 62 which are mounted on the respective four doors of the vehicle. The switch 50 is mounted on a fender so that it is accessible from outside the vehicle.

A lock-up relay 64 is arranged in parallel with the motor winding 10 and controls a contact 66, the contact 66 being in circuit with the lamp 34. The current flowing through the lamps 34 and 36 will not be sufficient to energize the relay 64. However, when the alarm is activated, the relay 64 is activiated to close the contact 66. The closing of the contact 66 acts to short out the lamp circuit and, therefore, the lamps 34 and 36 will be extinguished.

In the operation of the system, when the driver leaves the car, he first turns the key to close switch 16. This closes the circuit between the motor winding 10 and the battery 26 and energizes the lamp 34, the intensity of the lamp 34 being adjusted as desired by the rheostat 38. At this time, the switches 44, 46, and 48 for the gas refill cap, trunk lid and hood, respectively, are in the alarm circuit, whereby opening any of these parts would trigger the alarm. However, the vehicle doors and the lamp 36 are not in the alarm circuit at this time, so that the doors may be opened and the vehicle may be driven without triggering the alarm. On the other hand, if any attempt were made to open the trunk or hood or if any attempt were made to open the door for the gas refill, the alarm would be triggered.

When the driver wishes to place the entire system, including the doors, into the operative condition, as, for example, when he wishes to park the vehicle for the night, he moves the key-operated switch 50 into the closed position. This closes the circuit between the motor winding 10, the lamp 36 and the door switches 56, 58, 60 and 62. The lamp 36 then glows to indicate that the doors are now operatively connected into the alarm circuit. Since the key-operated switch 36 is located on one of the fenders, it is accessible to the driver when he wishes to remove the doors from the alarm circuit. However, even though accessible, it would still provide a barrier to a prospective burglar because it would still require a key to operate it.

Among the advantages of this system are the following: The lamps 34 and 36 not only provide an indication when their respective switches are operative in the alarm network, but also indicate if there is a defective component, such as a defective fuse, wiring, rheostat, siren, etc. anywhere in the circuit. They also indicate if there has been any tampering. The lamp 30 acts as a warning light to indicate that the door for the gas refill cap is open. The switch 16 should not be closed while the lamp 30 is glowing. If a burglar attempts to damage or remove the switch 50 while the network is energized or attempts to sever the leads of the alarm circuit, if the lead from the motor winding should touch the chassis ground, the alarm would be activated.

If the driver should forget to close the switch 50 on retiring for the night, as long as switch 16 is closed, a burglar cannot open either the hood, the trunk or the door for the gas refill cap without triggering the alarm.

The present system is ideal for armored trucks. For example, the driver of such a truck would first close switch 50 while leaving switch 16 open. He would then enter the truck and close switch 16. Thereafter, if someone should attempt to enter the truck while he was in it, such forceable entry would trigger the alarm. The same procedure can be used for mail trucks, pickup and delivery trucks or other vehicles of similar nature.

The invention claimed is:

1. A burglar alarm system for vehicles and the like comprising a motor for activating an alarm signal, said motor including a winding having one end in circuit with a source of electrical energy through a first key-operated switch and the other end in circuit with a plurality of switch means, each switch means being operatively connected to a means of ingress on a vehicle and at least one lamp being interposed in the circuit between said winding and said plurality of switch means, said plurality of switch means comprising a switch means operatively connected to the door for the refill cap of a vehicle, a switch means operatively connected to the trunk of the vehicle, a switch means operatively connected to the hood of the vehicle, and a switch means operatively connected to each door of the vehicle, the switch means for each door of the vehicle being selectively placed into and out of the operative alarm circuit by a second key-operated switch.

2. The system of claim 1 wherein said second operated switch is located on a fender of vehicle.

3. The system of claim 1 wherein a second lamp is in circuit between said second key-operated switch and the switch means operatively connected to each door of the vehicle.

4. The system of claim 3 wherein each of said lamps is provided with means to selectively adjust the intensity of the current flowing therethrough.

5. The system of claim 1 wherein a signal lamp circuit is provided between said source of electrical energy and the door for the refill cap, said signal lamp circuit including a signal switch constructed and arranged to open when said door is closed and to close when said door is opened, and a lamp interposed in said signal lamp circuit between said signal switch and said source of electrical energy.

* * * * *